United States Patent
Fujino

(10) Patent No.: US 12,488,834 B2
(45) Date of Patent: Dec. 2, 2025

(54) READ ASSIST CIRCUIT FOR MEMORY DEVICE AND OPERATION METHOD THEREOF

(71) Applicant: TAIWAN SEMICONDUCTOR MANUFACTURING COMPANY, LTD., Hsinchu (TW)

(72) Inventor: Yorinobu Fujino, Kanagawa (JP)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 513 days.

(21) Appl. No.: 17/873,686

(22) Filed: Jul. 26, 2022

(65) Prior Publication Data

US 2024/0038296 A1 Feb. 1, 2024

(51) Int. Cl.
*G11C 11/419* (2006.01)

(52) U.S. Cl.
CPC .................. *G11C 11/419* (2013.01)

(58) Field of Classification Search
CPC .................................. G11C 11/419
USPC ..................................... 365/189.15
See application file for complete search history.

(56) References Cited

U.S. PATENT DOCUMENTS

| | | | |
|---|---|---|---|
| 9,837,141 B2* | 12/2017 | Van Winkelhoff | G11C 7/00 |
| 11,475,944 B2* | 10/2022 | Mathur | G11C 11/418 |
| 2006/0157679 A1* | 7/2006 | Scheuerlein | G11C 11/21 257/2 |
| 2010/0165770 A1* | 7/2010 | Matsuoka | G11C 11/4097 365/207 |
| 2012/0075918 A1* | 3/2012 | Arsovski | G11C 8/08 365/230.06 |

* cited by examiner

*Primary Examiner* — Sung Il Cho
(74) *Attorney, Agent, or Firm* — Birch, Stewart, Kolasch & Birch, LLP

(57) ABSTRACT

A memory device is provided, including a first word line coupled to a first memory cell, a second word line coupled to a second memory cell, and a read assist circuit coupled between the first and second word lines, and in a first time period configured, in response to a first control signal, to adjust a voltage level of the first word line to a first voltage and to adjust a voltage level of the second word line to a second voltage. In some embodiments, the first voltage is smaller than a first supply voltage, and the second voltage is greater than a second supply voltage smaller than the first supply voltage.

20 Claims, 12 Drawing Sheets

READ ASSIST CIRCUIT FOR MEMORY DEVICE AND OPERATION METHOD THEREOF

BACKGROUND

In advanced technology node, reliabilities of SRAM such as Static Noise Margin (SNM) are getting worse. Read assist technique is the key technology and should be induced for ensuring SNM during read and write operation.

There is a lowering word line (WL) voltage technique which is one of read assist approaches. It provides easy controllable lowering levels and has simple circuits; however, it needs additional extra transistors then WL driver area will be larger.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
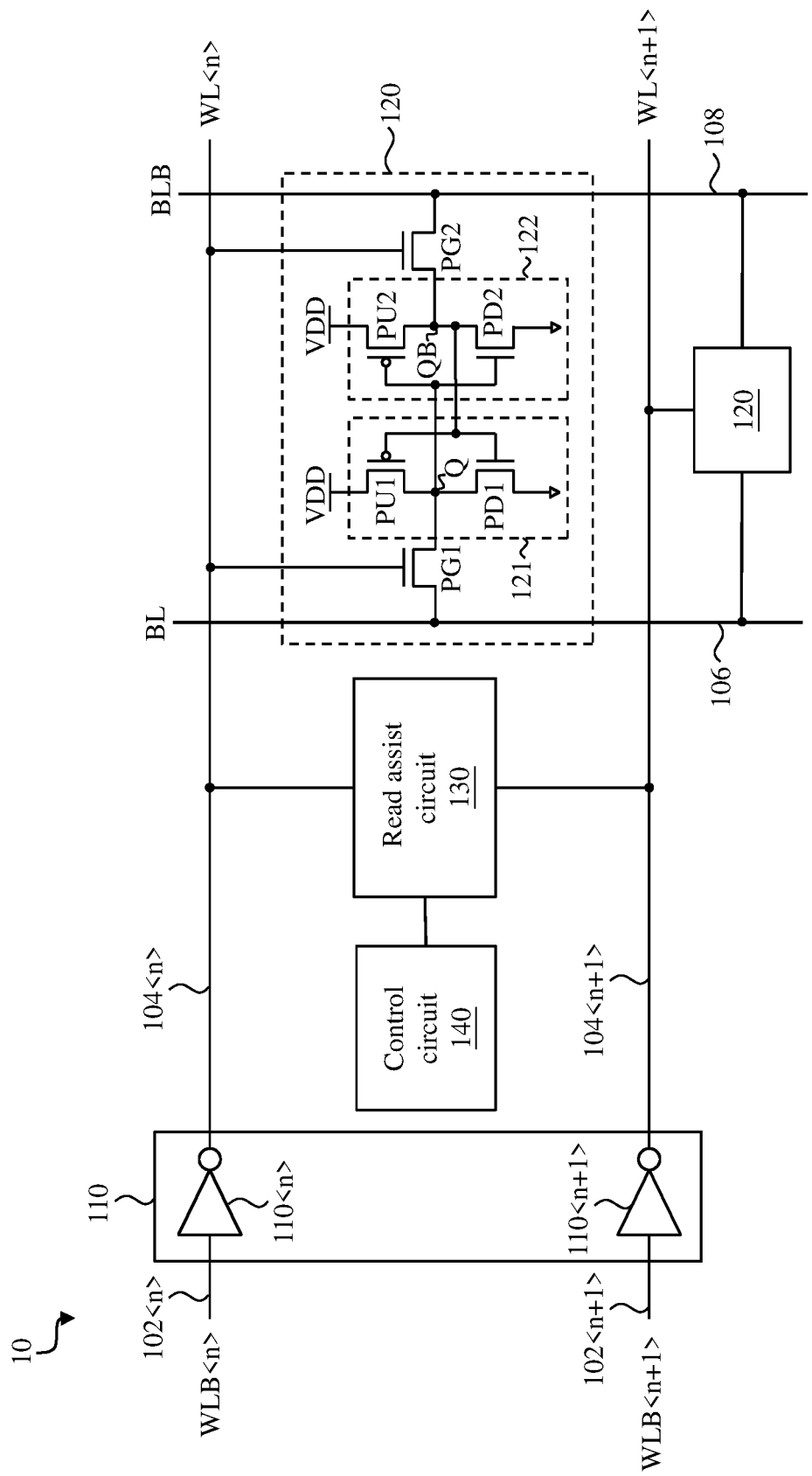
FIG. 1 is a schematic diagram of part of a memory device, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," "containing," "involving," and the like are to be understood to be open-ended, i.e., to mean including but not limited to.

Reference throughout the specification to "one embodiment," "an embodiment," or "some embodiments" means that a particular feature, structure, implementation, or characteristic described in connection with the embodiment(s) is included in at least one embodiment of the present disclosure. Thus, uses of the phrases "in one embodiment" or "in an embodiment" or "in some embodiments" in various places throughout the specification are not necessarily all referring to the same embodiment. Furthermore, the particular features, structures, implementation, or characteristics may be combined in any suitable manner in one or more embodiments.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. As used herein, the term "and/or" includes any and all combinations of one or more of the associated listed items.

As used herein, "around", "about", "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments, it shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

In some approaches, a lowering word line (WL) voltage technique is utilized in SRAM devices in read operation.

Specifically, a pull down circuit, for example, including transistors coupled between the word line and a ground, is configured to suppress word line voltage level. When a large suppress word line voltage level is required in certain application, numerous pull down circuits are equipped and therefore memory device area suffers. In some embodiments of the present application, a new structural circuit is provided to configure pull down circuit sharing between word lines, and accordingly, area and loading of the pull down circuit reduce.

Reference is now made to FIG. 1. FIG. 1 is a schematic diagram of part of a memory device, in accordance with some embodiments of the present disclosure. For illustration, FIG. 1 illustrates a memory device 10 including memory cells 120 of transistor static random access memory (SRAM) with a word line driver circuit 110, a read assist circuit 130, and a control circuit 140. The word line driver circuit 110 is coupled to word lines 102<n>, 102<n+1>, and 104<n>, 104<n+1>, and configured to receive word line signals WLB<n>, WLB<n+1> and according output corresponding word line signals WL<n>, WL<n+1> that are inverted from the word line signals WLB<n>, WLB<n+1> by inverters 110<n>, 110<n+1> in the word line driver circuit 110. In some embodiments, the word line signals WLB<n>, WLB<n+1> are associated with a word line address for selecting a word line to access. As shown in FIG. 1, the read assist circuit 130 and the control circuit 140 are coupled between two word line 104<n> and 104<n+1>. In some embodiments, the word line 104<n+1> is the word line coupled to the memory cell 120 in a row adjacent to the row in which another memory cell 120 is coupled to the word line 104<n>.

In some embodiments, the memory device 10 includes a number of memory cells 120, and the memory cells 120 are arranged by columns and rows in a memory cell array (not shown in figures). For illustrative purposes, only two memory cells 120 coupled to bit lines 106 and 108 to receive bit line signals BL and BLB are illustrated in FIG. 1. Various numbers of the memory cells 120 are within the contemplated scope of the present disclosure.

In some embodiments, the memory cell 120 includes a first inverter 121 and a second inverter 122. The first inverter 121 and the second inverter 122 are cross-coupled. Effectively, the first inverter 121 and the second inverter 122 operate as a data latch. For illustration, an output node of the first inverter 121 and an input node of the second inverter 122 are connected together at a node Q shown in FIG. 1. An input node of the first inverter 121 and an output node of the second inverter 122 are connected together at a node QB shown in FIG. 1.

For illustration of operation, the data latch, including the first inverter 121 and the second inverter 122, is able to store a bit of data at the node Q. For illustration, a voltage level on the node Q is able to be configured at different voltage levels. The voltage level of the node Q represents logic "1" or logic "0" corresponding to logic data stored in the memory cell 120. The node QB has a logical level opposite to that of the node Q. For convenience of illustration hereinafter, logic "0" indicates a low level, and logic "1" indicates a high level. The indications are given for illustrative purposes. Various indications are within the contemplated scope of the present disclosure.

In some embodiments, the memory cell 120 illustrated in FIG. 1 is a static random-access memory (SRAM) cell, including, for illustration, six transistors PU1-PU2, PD1-PD2 and PG1-PG2. The transistors PU1 and PD1 are configured and operate as the first inverter 121. The transistors PU2 and TD2 are configured and operate the second inverter 122. In some embodiments, the transistors PD1-PD2 and PG1-PG2 are N-type transistors, and the transistors PU1-PU2 are P-type transistors.

In some embodiments, the transistor PG1 is configured as a first pass gate transistor, and the transistor PG2 is configured as a second pass gate transistor. For illustration, gate terminals of the transistor PG1 and the transistor PG2 are coupled to the word line 104<n> and controlled by the word line signal WL<n>. The output node of the first inverter 121 and the input node of the second inverter 122, i.e., the node Q, are coupled through the transistor PG1 to the bit line 106 carrying the bit line signal BL. The input node of the first inverter 121 and the output node of the second inverter 122, i.e., the node QB, are coupled through the transistor PG2 to the complementary bit line 108 carrying the complementary bit line signal BLB.

In some embodiments, the memory device 10 includes multiple memory cells (not shown), and the word line signals, for example, WL<n>, WL<n+1> are utilized to select and trigger at least one of the memory cells, for example, the memory cell 120, for a write/read operation of the memory device 10. When the memory cell 120 is not selected in response to the corresponding word line signal, the memory cell 120 maintains the same voltage levels on the node Q and the node QB.

Figure 2:
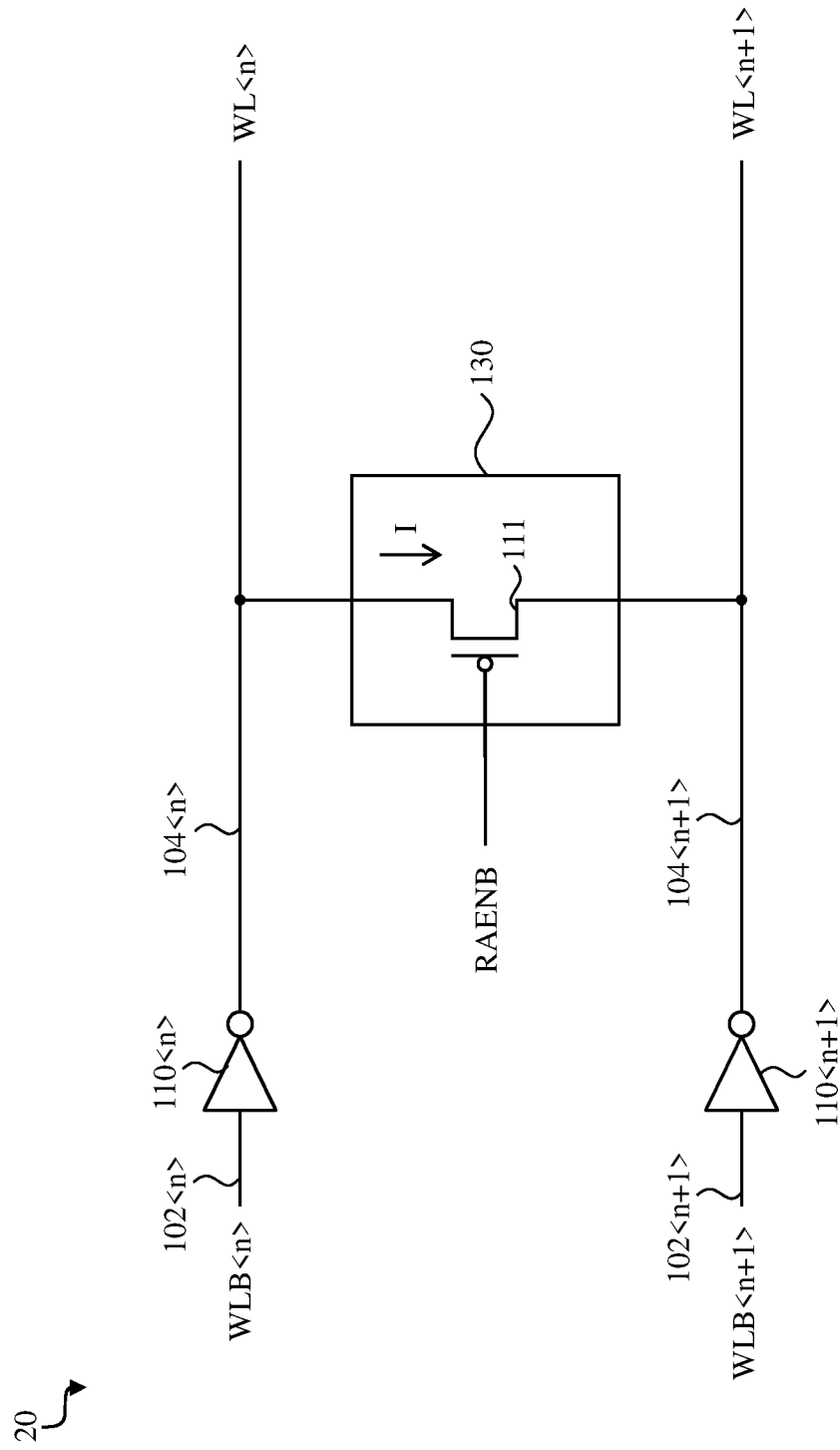
FIG. 2 is a schematic diagram of part of a memory device, in accordance with some embodiments of the present disclosure.

Reference is now made to FIG. 2. FIG. 2 is a schematic diagram of part of a memory device 20 corresponding to the memory device 10 of FIG. 1, in accordance with some embodiments of the present disclosure. With respect to the embodiments of FIG. 1, like elements in FIG. 2 are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 2.

The memory device 10 is configured with respect to, for example, the memory device 10 of FIG. 1. For illustration, as illustratively shown in the embodiments of FIG. 2, the read assist circuit 130 includes a P-type transistor 111 having a terminal coupled to the word line 104<n>, another terminal coupled to the word line 104<n+1>, and the other terminal configured to receive a control signal RAENB generated by the control circuit 140. In some embodiments, the control signal RAENB has a logic low (e.g., "0") when a read operation is performed.

Figure 3:
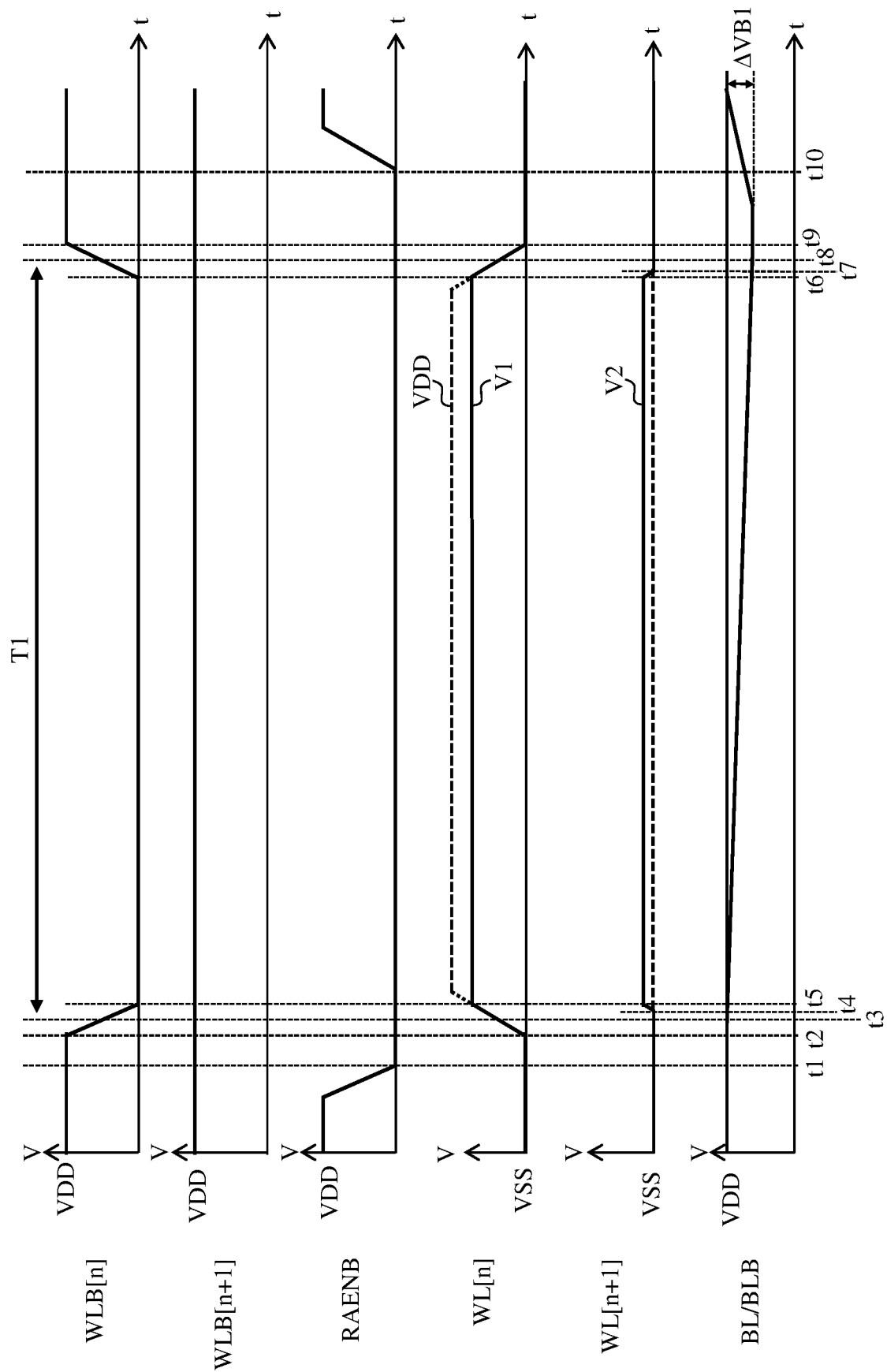
FIG. 3 illustrates waveforms of signals in the memory device corresponding to FIGS. 1-2, in accordance with some embodiments of the present disclosure.

For operation of the memory device 20, Reference is now made to FIG. 3. FIG. 3 illustrates waveforms of signals in the memory device 20 corresponding to FIGS. 1-2, in accordance with some embodiments of the present disclosure.

At time t1, the control circuit 140 is configured to change the voltage level of the control signal RAENB from having the supply voltage VDD (referred to as a high logic state "1") to the supply voltage VSS (referred to as a low logic state "0"), for example, the supply voltage VSS equal to a ground voltage. Accordingly, the read assist circuit 130 is enabled and the P-type transistor 111 included in the read assist circuit 130 of FIG. 2 is gradually turned on to electrically connect the word line 104<n> to the word line 104<n+1>.

At time t2, in response to the word line address indicating that the word line 104<n> is to be activated (asserted,) the inverter 110<n> receives and inverts the word line signal WLB<n> having decreasing voltage level and accordingly generates the word line signal WL<n> having increasing voltage level. In addition, the voltage level of the word line signal WLB<n+1> remains the same.

At time t3, as the voltage level of the word line signal WL<n> is enough to turn on the transistors PG1-PG2 to discharge the one of the bit lines 106 and 108, the read operation starts and continues in a time period T1 (for example, from time t3 to time t8), as shown in FIG. 3. The voltage level of one of the bit line signals BL and BLB on the corresponding one of the bit lines 106 and 108 declines.

During time t4 to t6, the read assist circuit 130 configured to adjust the voltage level of the word line 104<n> to a voltage V1 and to adjust the voltage level of the word line 104<n+1> to a voltage V2. Specifically, the turned on transistor 111 in the read assist circuit 130 charges the word line 104<n+1> by transmitting a DC current I from the word line 104<n> to the word line 104<n+1>. The voltages V1 and V2 are associated with a conductive resistance of the P-type transistor 111 and the parasitic resistance in connections between terminals of the P-type transistor 111 and the word lines 104<n>, 104<n+1>. Alternatively stated, in some embodiments, the voltages V1 and V2 are determined by resistance ratio of current path consist of the wires between the read assist circuit 130 and the word lines 104<n>, 104<n+1> and the resistance of the element in the read assist circuit 130. For example, the size of the P-type transistor 111 determines the resistance of the read assist circuit 130.

In some embodiments, the voltage V1 is smaller than the supply voltage VDD and about, for example, 1 Volt. The voltage V2 is greater than the supply voltage VSS (e.g., the ground voltage) and about, for example, 50 mV to 100 mV. In various embodiments, the voltages V1 and V2 are referred to as the high logic state "1" and as the low logic state "0" respectively.

At time t6, in response to terminating the read operation, the inverter 110<n> receives and inverts the word line signal WLB<n> having increasing voltage level and accordingly generates the word line signal WL<n> having decreasing voltage level. The voltage level of the word line signal WL<n> declines from the voltage V1, and accordingly the voltage level of the word line signal WL<n+1> decreases from the voltage V2 at time t6.

At time t7, the voltage level of the word line signal WL<n+1> reaches the supply voltage VSS while the voltage level of the word line signal WL<n> is still greater than the supply voltage VSS.

At time t8, as the voltage level of the word line signal WL<n> is lower enough to gradually turn off the transistors PG1-PG2, the read operation ends.

At time t9, as the word line signal WLB<n> has the supply voltage VDD, the inverter 110<0> outputs the word line signal WL<n> having the supply voltage VSS. Alternatively stated, the word line 104<n> is discharged to the supply voltage VSS. In some embodiments, the voltage level of one of the bit line signals BL and BLB on the corresponding one of the bit lines 106 and 108 has a voltage difference ΔVB1 to the supply voltage VDD, as shown in FIG. 3.

At time t10, the control circuit 140 is configured to change the voltage level of the control signal RAENB from having the supply voltage VSS to the supply voltage VDD. Accordingly, the read assist circuit 130 is disabled and the P-type transistor 111 included in the read assist circuit 130 of FIG. 2 is gradually turned off to electrically disconnect the word line 104<n> to the word line 104<n+1>.

In some conventional approaches, a suppressed word line voltage level is achieved by utilizing a pull down circuit, for example, including a P-type transistor coupled between each word line and the ground terminal, to reduce the voltage level of each word line. As larger the suppressed word line voltage level is desired, more pull down circuits are equipped in the memory devices, according to the application. Accordingly, in those approaches, significant area is occupied by the pull-down circuits in devices. Moreover, each of control signals for enabling the read assist circuit, for example, RAENB in FIG. 2, suffers from large gate capacitances due to each coupled word line. To sum up, area penalty and heavy loading of the pull down circuits influence performance of cost of the memory device.

Compared with the approaches, with the configurations of the present application, as at least two adjacent word line share one pull down circuit, the total amount and loading of the pull down circuit is cut into half of that of some approaches and area for pull down circuit reduces. Furthermore, smaller area is required by the word line driver circuit and the pull down circuits benefit from lower input loading.

The configurations of FIGS. 1-3 are given for illustrative purposes. Various implements are within the contemplated scope of the present disclosure. For example, in some embodiments, the values of the voltages V1-V2 are different from those given above.

Figure 4:
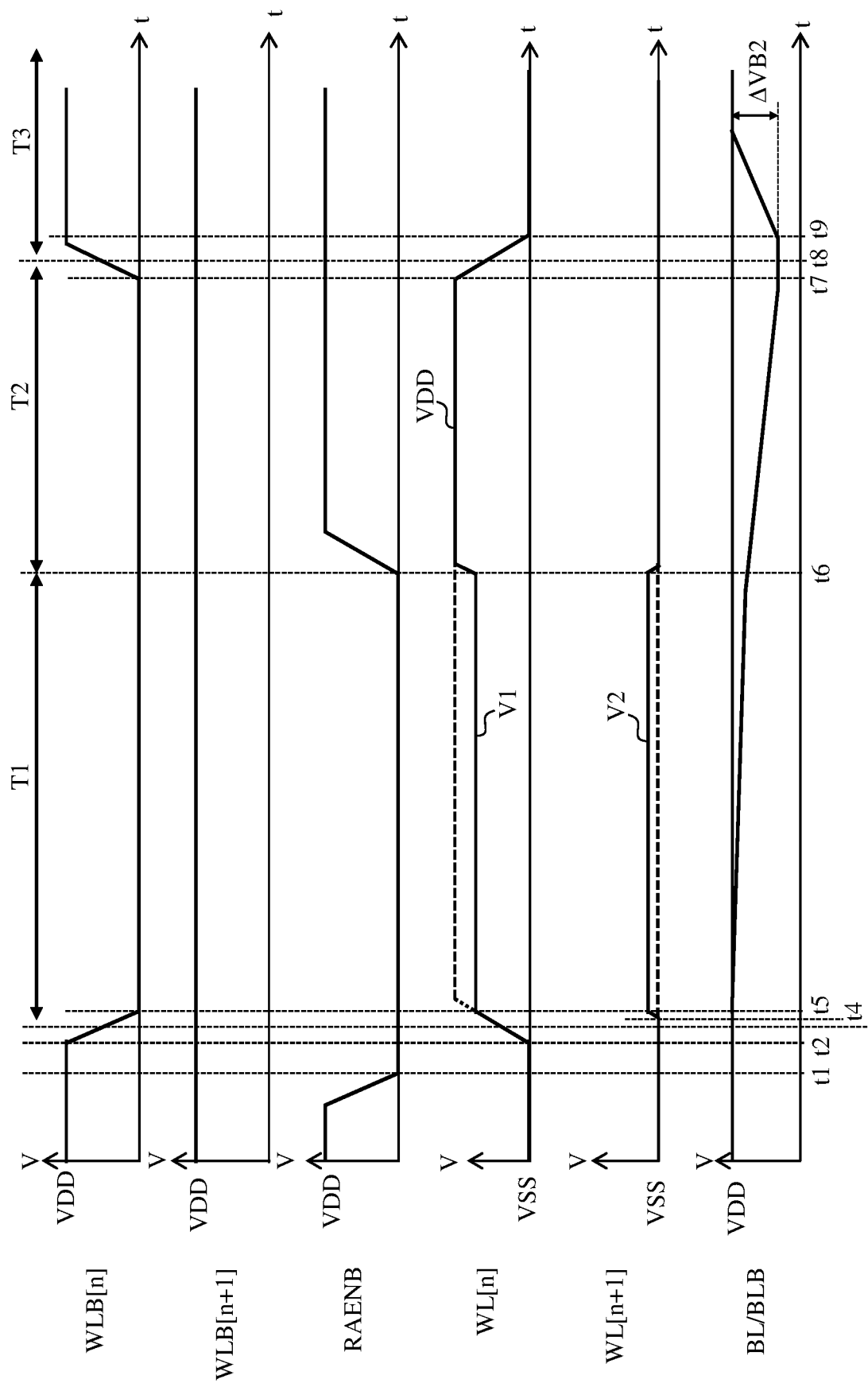
FIG. 4 illustrates waveforms of signals in the memory device corresponding to FIGS. 1-2, in accordance with some embodiments of the present disclosure.

Reference is now made to FIG. 4. FIG. 4 illustrates waveforms of signals in the memory device corresponding to FIGS. 1-2, in accordance with some embodiments of the present disclosure. With respect to the embodiments of FIGS. 1-3, like elements in FIG. 4 are designated with the same reference numbers for ease of understanding.

Compared with the embodiments of FIG. 3, the read operation is performed in two time periods T1 and T2, as shown in FIG. 4. For illustration, the time period T1 is from time t3 to time t6, and the time period is from time t6 to t8. In some embodiments, the operations during time t1 to t6 in the embodiments of FIGS. 3-4 have the same configurations.

At time t6 as the beginning of the time period T2, as shown in FIG. 4, the word line signal WLB<n> remains having the low logic state and the control circuit 140 is configured to change the logic state of the control signal RAENB to the high logic state. Accordingly, the read assist circuit 130 is disabled and the P-type transistor 111 included in the read assist circuit 130 of FIG. 2 is gradually turned off to electrically disconnect the word line 104<n> to the word line 104<n+1>. Alternatively stated, the current I is cut, the inverter 110<n> in the word line driver circuit 110 is configured to charge the word line 104<n> to have the supply voltage VDD, and the inverter 110<n+1> in the word line driver circuit 110 is configured to discharge the word line 104<n+1> to have the supply voltage VSS during time t6 to time t7.

With continued reference to the embodiments above, as the read assist circuit 130 is disabled and the word line 104<n> is activated (i.e., the word line signal WL<n> has the low logic state) to have the supply voltage VDD that is greater than the voltage V1, the transistors PG1 and PG2 are turned on to greater extend to discharge one of the bit lines 106 and 108. Thus, one of the bit line signals BL and BLB drops more significantly, which results in a voltage difference ΔVB2 between the bit line signals BL and BLB, the voltage difference ΔVB2 being greater than the voltage difference ΔVB1 in FIG. 3.

At time t7, in response to terminating the read operation, the inverter 110<n> receives and inverts the word line signal WLB<n> having increasing voltage level and accordingly generates the word line signal WL<n> having decreasing voltage level. The voltage level of the word line signal WL<n> declines from the supply voltage VDD.

At time t8, as the voltage level of the word line signal WL<n> is lower enough to gradually turn off the transistors PG1-PG2, the time period T2 of the read operation ends.

At time t9, as the word line signal WLB<n> has the supply voltage VDD, the inverter 110<0> outputs the word line signal WL<n> having the supply voltage VSS. Alternatively stated, the word line 104<n> is discharged to the supply voltage VSS.

The configurations of FIG. 4 are given for illustrative purposes. Various implements are within the contemplated scope of the present disclosure. For example, in some embodiments, the time period T1 is different from the time period T2. For example, the time period T1 is greater than the time period T1. In various embodiments, the time periods T1-T2 are the same. The skilled person in the art can adjust the durations of the time periods T1-T2 according to the actual practice of the present application.

Figure 5:
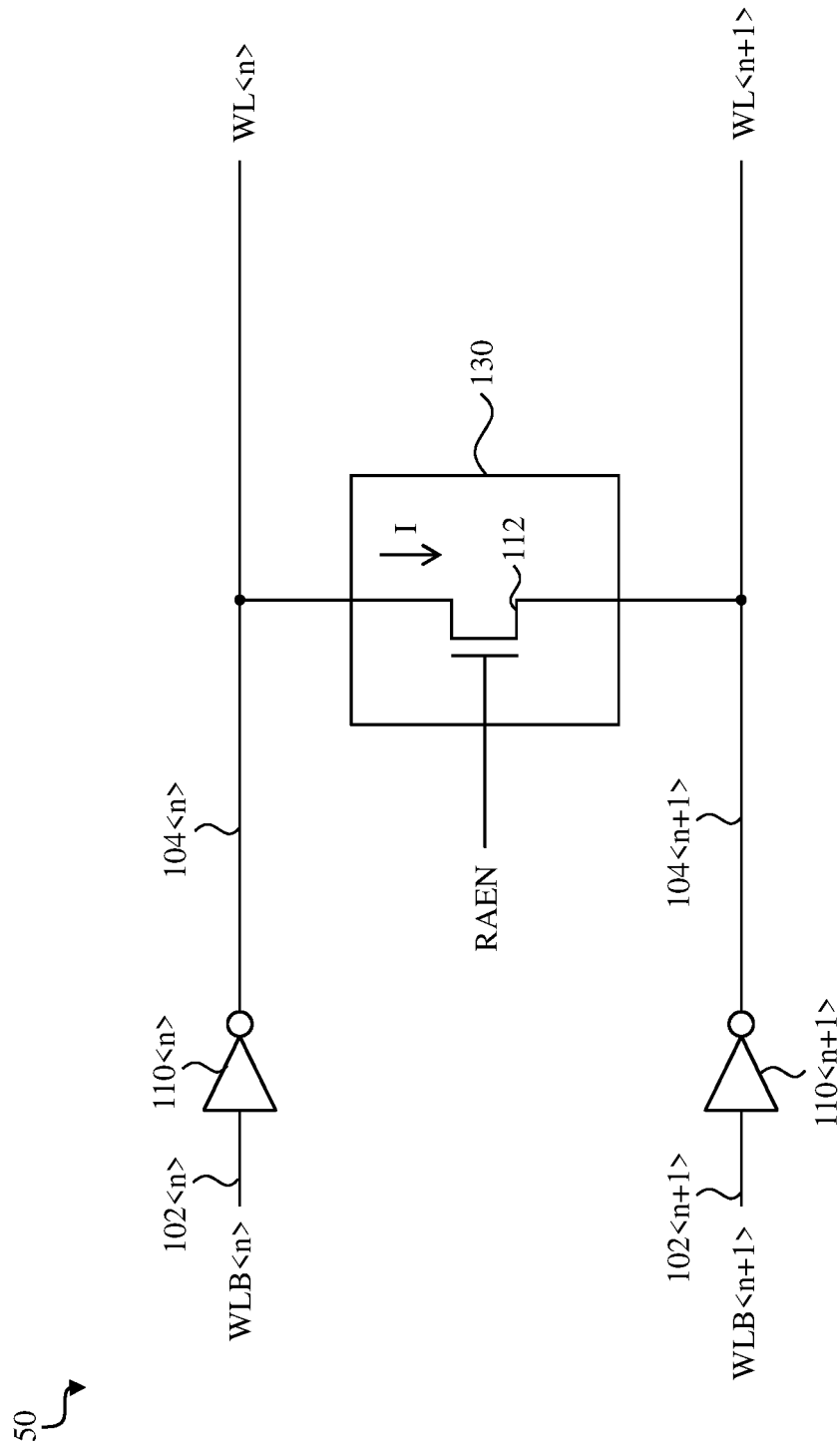
FIG. 5 is a schematic diagram of part of a memory device, in accordance with some embodiments of the present disclosure.

Reference is now made to FIG. 5. FIG. 5 is a schematic diagram of part of a memory device 50, in accordance with some embodiments of the present disclosure. With respect to the embodiments of FIGS. 1-4, like elements in FIG. 5 are designated with the same reference numbers for ease of understanding. In some embodiments, the memory device 50 is configured with respect to, for example, the memory device 10 of FIG. 1.

Compared with the embodiments of FIG. 2, instead of having the P-type transistor in the read assist circuit 130, the read assist circuit 130 in FIG. 5 has a N-type transistor 112 having two terminals coupled between the word lines 104<n> and 104<n+1> for transmitting the current I. Specifically, the N-type transistor 112 receives a control signal control signal RAEN at its gate terminal, in which the control signal RAEN in FIG. 5 has a different logic state from the control signal RAENB.

Figure 6:
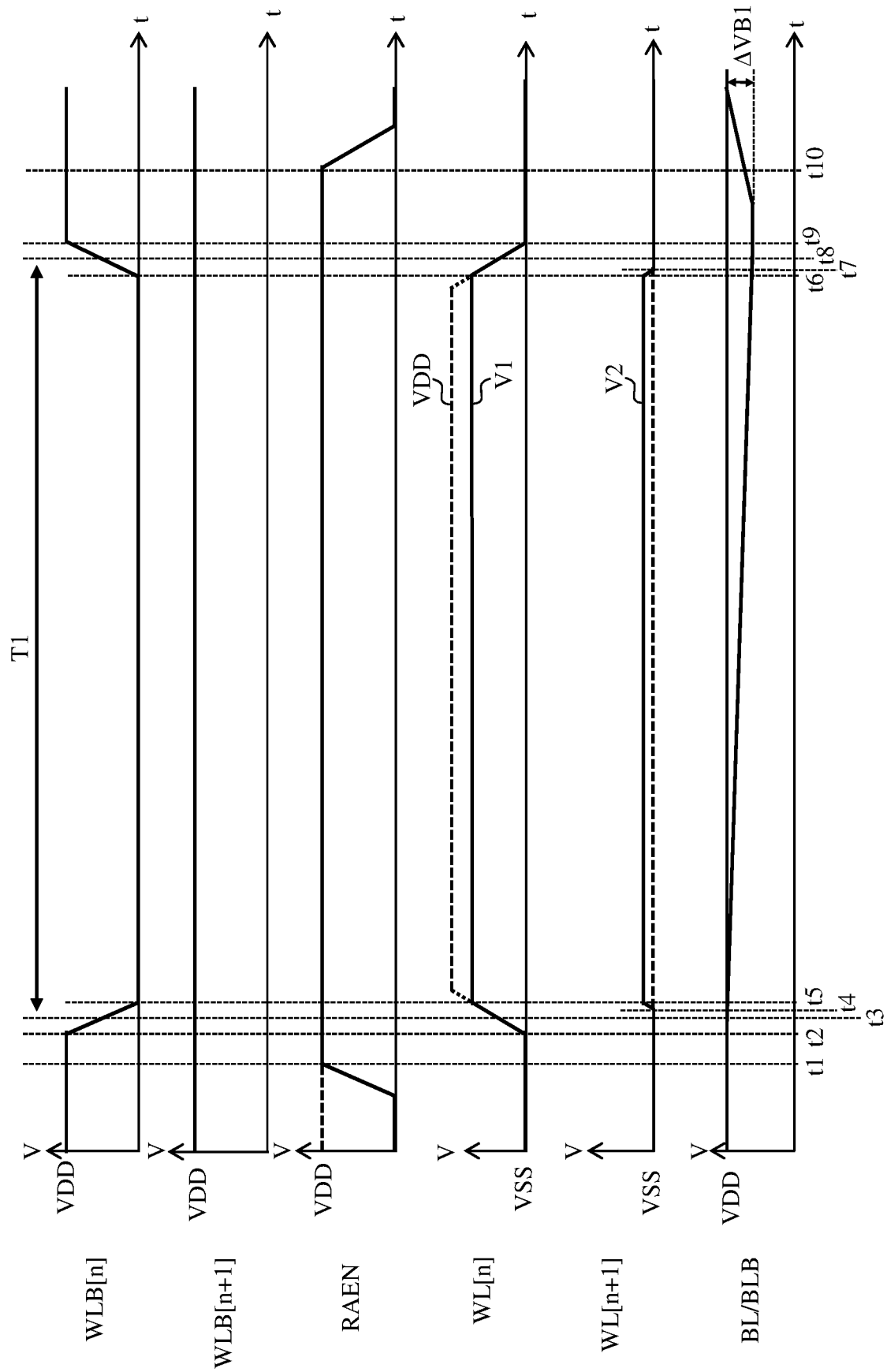
FIG. 6 illustrates waveforms of signals in the memory device corresponding to FIGS. 1 and 5, in accordance with some embodiments of the present disclosure.
Figure 7:
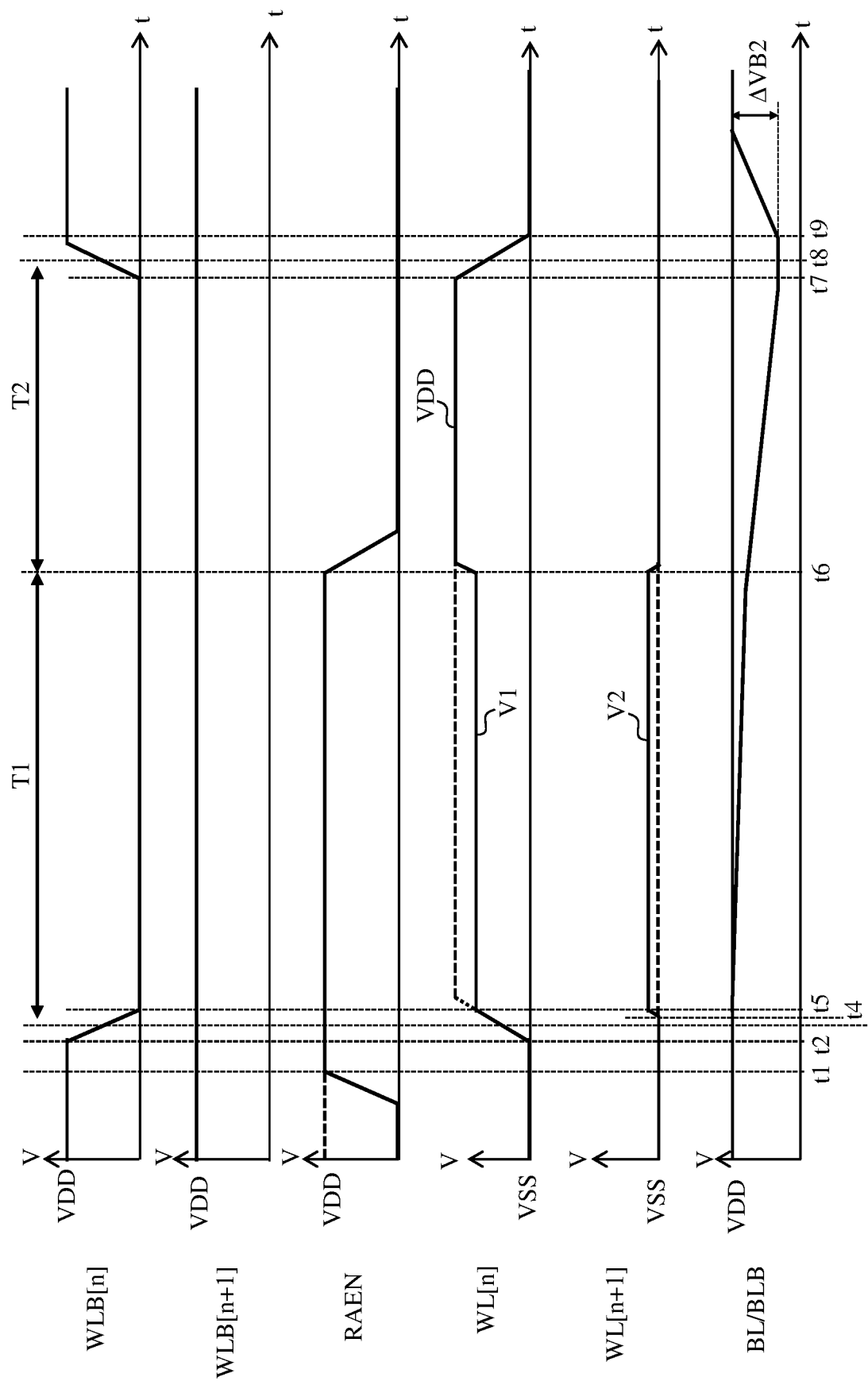
FIG. 7 illustrates waveforms of signals in the memory device corresponding to FIGS. 1 and 5, in accordance with some embodiments of the present disclosure.

Reference is now made to FIGS. 6 and 7. FIGS. 6 and 7 illustrate waveforms of signals in the memory device corresponding to FIGS. 1 and 5, in accordance with some embodiments of the present disclosure. With respect to the embodiments of FIGS. 1-5, like elements in FIGS. 6-7 are designated with the same reference numbers for ease of understanding.

Compared with the waveforms in FIG. 3, instead of having the control signal RAENB, the embodiments in FIG. 6 show that the read assist circuit 130 operates in response to the control signal RAEN. Specifically, the read assist circuit 130 is enabled in response to the control signal RAEN having the high logic state and is disabled in response to the control signal RAEN having the low logic state.

Figure 8:
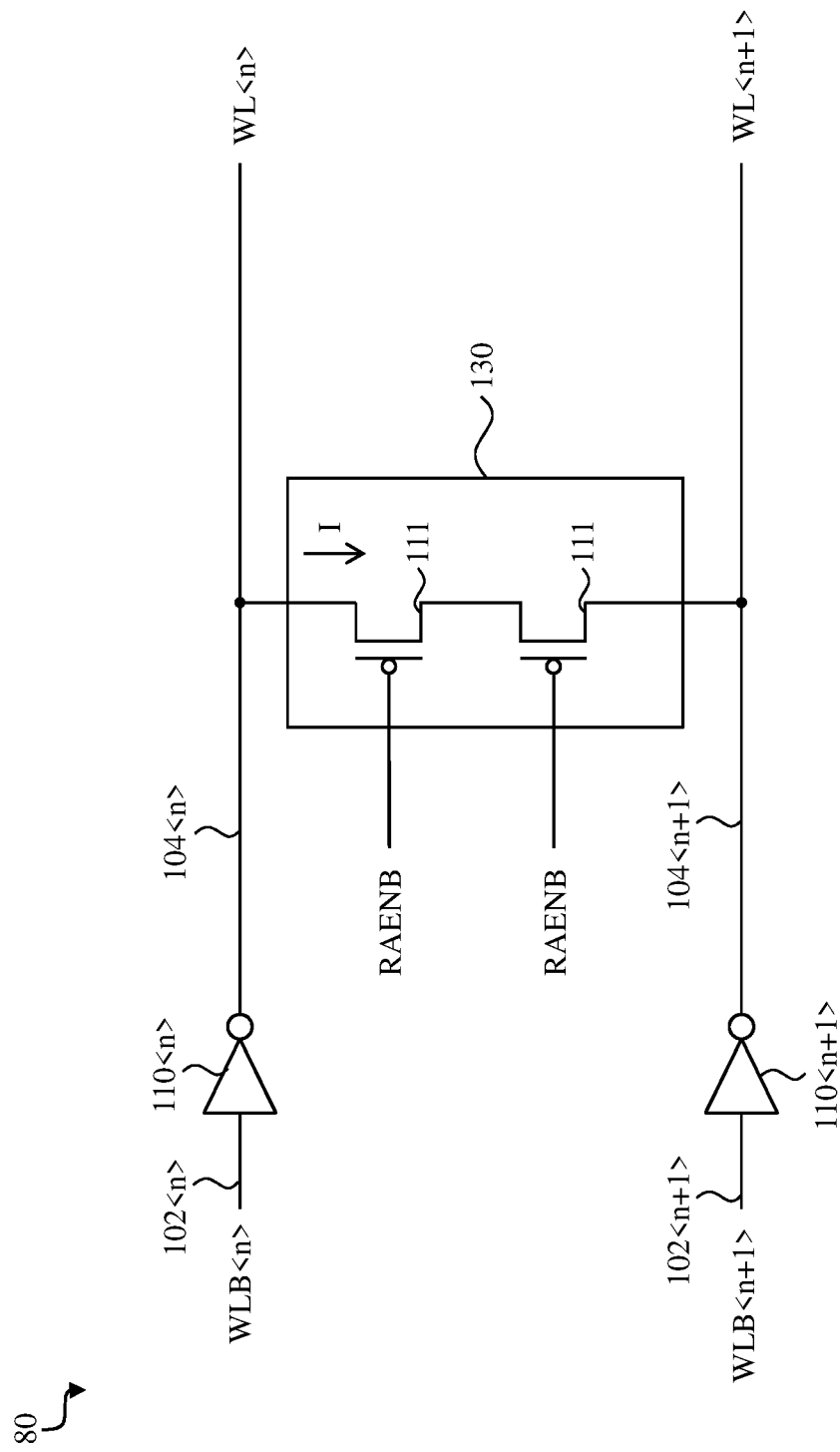
FIG. 8 is a schematic diagram of part of a memory device, in accordance with some embodiments of the present disclosure.

Reference is now made to FIG. 8. FIG. 8 is a schematic diagram of part of a memory device 80, in accordance with some embodiments of the present disclosure. With respect to the embodiments of FIGS. 1-7, like elements in FIG. 8 are designated with the same reference numbers for ease of understanding. In some embodiments, the memory device 80 is configured with respect to, for example, the memory device 10 of FIG. 1.

Compared with the embodiments of FIG. 2, instead of having one P-type transistor in the read assist circuit 130, the read assist circuit 130 in FIG. 8 has at least two P-type transistors 111 coupled in series between the word lines 104<n> and 104<n+1> for transmitting the current I.

The configurations of FIG. 8 are given for illustrative purposes. Various implements are within the contemplated scope of the present disclosure. For example, in some embodiments, the read assist circuit 130 includes more than two P-type transistors coupled in series between the two adjacent word lines. In various embodiments, the read assist circuit 130 includes two or more than two N-type transistors that are coupled in series between the two adjacent word lines and operate in response to the control signals having logic states different from those to the P-type transistors.

Figure 9:
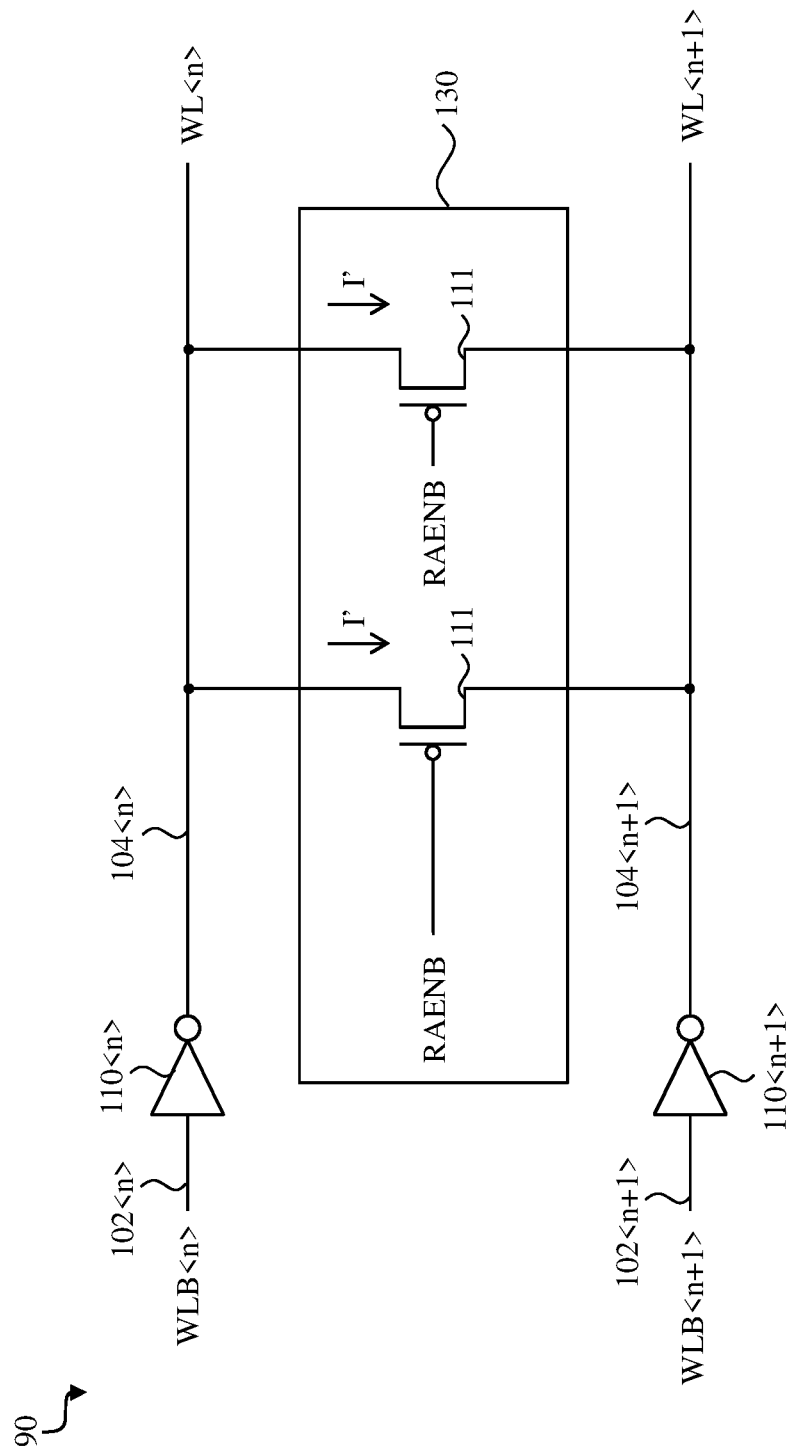
FIG. 9 is a schematic diagram of part of a memory device, in accordance with some embodiments of the present disclosure.

Reference is now made to FIG. 9. FIG. 9 is a schematic diagram of part of a memory device 90, in accordance with some embodiments of the present disclosure. With respect to the embodiments of FIGS. 1-8, like elements in FIG. 9 are designated with the same reference numbers for ease of understanding. In some embodiments, the memory device 90 is configured with respect to, for example, the memory device 10 of FIG. 1.

Compared with the embodiments of FIG. 8, instead of having two P-type transistors coupled in series, the read assist circuit 130 in FIG. 9 has at least two P-type transistor 111 coupled in parallel between the word lines 104<n> and 104<n+1> for transmitting current I'.

The configurations of FIG. 9 are given for illustrative purposes. Various implements are within the contemplated scope of the present disclosure. For example, in some embodiments, the read assist circuit 130 includes more than two P-type transistors coupled in parallel between the two adjacent word lines. In various embodiments, the read assist circuit 130 includes two or more than two N-type transistors that are coupled in parallel between the two adjacent word lines and operate in response to the control signals having logic states different from those to the P-type transistors.

Figure 10A:
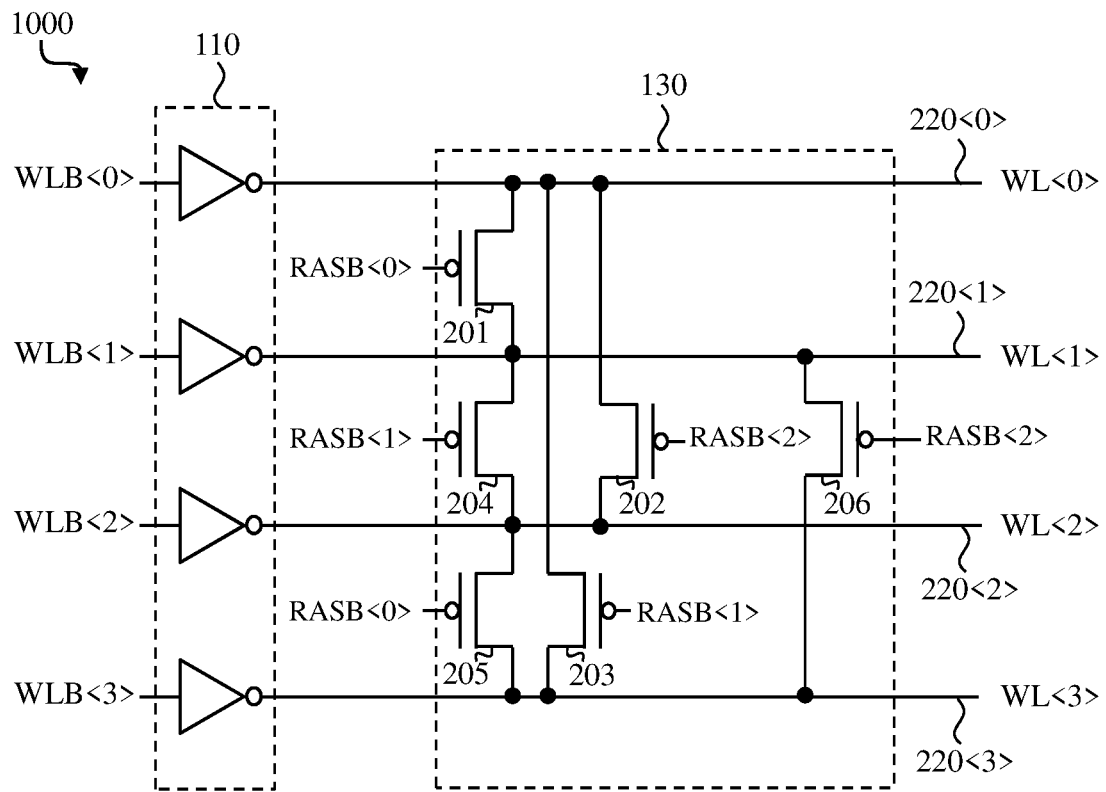
FIG. 10A is a schematic diagram of part of a memory device, in accordance with some embodiments of the present disclosure.
Figure 10B:
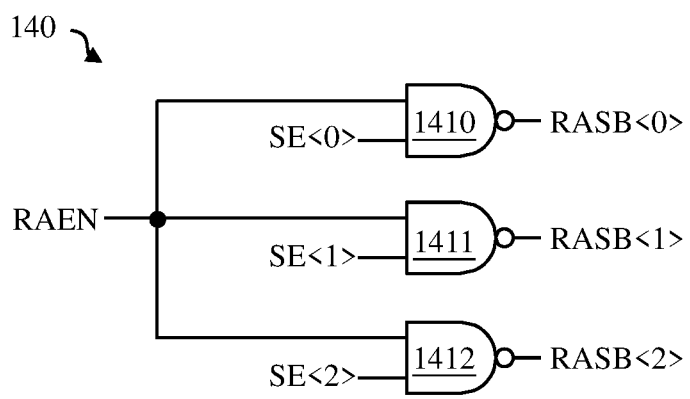
FIG. 10B is a schematic diagram of a control circuit, in accordance with some embodiments of the present disclosure.

Reference is now made to FIGS. 10A-10B. FIG. 10A is a schematic diagram of part of a memory device 1000, and FIG. 10B is a schematic diagram of the control circuit 140, in accordance with some embodiments of the present disclosure. With respect to the embodiments of FIGS. 1-9, like elements in FIGS. 10A-10B are designated with the same reference numbers for ease of understanding. In some embodiments, the memory device 1000 is configured with respect to, for example, the memory device 10 of FIG. 1.

For illustration, the memory device 1000 includes the word line driver circuit 110 configured to receive and invert word line signals WL<0>-WL<3> to generate word line signals WL<0>-WL<3> on word lines 220<0>-200<3> separately. The memory device 10 also includes the read assist circuit 130 having multiple transistors 201-206. In some embodiments, the transistors 201-206 are P-type transistors and configured with respect to, for example, the P-type transistor 111. As shown in FIG. 10A, the transistor 201 is coupled between the word line 220<0> and the word line 220<1>. The transistor 202 is coupled between the word line 220<0> and the word line 220<2>. The transistor 203 is coupled between the word line 220<0> and the word line 220<3>. The transistor 204 is coupled between the word line 220<1> and the word line 220<2>. The transistor 205 is coupled between the word line 220<2> and the word line 220<3>. The transistor 206 is coupled between the word line 220<1> and the word line 220<3>.

In some embodiments, each of the word lines 220<0>-200<3> are coupled to three transistors in the transistors 201-206. Specifically, the word line 220<0> is coupled to the word line 220<1>-220<3> through the transistors 201-203. The word line 220<1> is coupled to the word line 220<0>, 220<2>-220<3> through the transistors 201, 204, 206. The word line 220<2> is coupled to the word line 220<0>, 220<1>, 220<3> through the transistors 202, 204-205. The word line 220<3> is coupled to the word line 220<0>-220<2> through the transistors 203, 205-206.

In some embodiments, the control circuit 140 in FIG. 10B includes multiple NAND gates 1410-1412. In some embodiments, each of the NAND gates 1410-1412 is configured to receive the control signal RAEN, inverted from the control signal RAENB, and one of selection signals SE<0>-SE<2> and to generate a corresponding control signal (one of control signals RASE<0>-RASE<2>) to control corresponding transistors in the transistors 201-206.

With continued reference to both FIGS. 10A-10B, the transistors 201 and 205 receive the control signal RASB<0>. The transistors 203 and 204 receive the control signal RASB<1>. The transistors 202 and 206 receive the control signal RASB<2>. In some embodiments, the transistors 201-206 are configured to be turned on separately in response to the control signals control signal RASB<0>-RASB<2> to adjust voltage levels of the word lines 220<0>-220<3>.

For example, in the read operation, the word line 220<0> is activated. The word line signal WL<0> has the high logic state and other word line signals WL<1>-WL<3> have the low logic state. Moreover, in FIG. 10B, in some embodiments, the control signal RAEN has the high logic state in the read operation and the selection signal SE<0> has the high logic state while the selection signals SE<1>-SE<2> have the low logic state. The NAND gate 1410 outputs the control signal RASB<0> having the low logic state, and the NAND gates 1411-1412 output control signals RASB<1>-RASB<2> having the high logic state. Accordingly, the transistor 201 is turned on to discharge the word line 220<0> and adjust the voltage levels of the word line 220<0>-220<1>, as shown in FIG. 2. Specifically, the voltage level of the word line signal WL<0> decreases to be, for example, the voltage V1, and the voltage level of the word line signal WL<1> increases to be, for example, the voltage V2.

In various embodiments, at least two of the six transistors 201-206 are configured to be turned on to reduce a voltage level of one of the word lines. For example, when both of the selection signals SE<0>-SE<1> have the high logic state, both of the control signals RASB<0>-RASB<1> have the low logic state. Accordingly, the transistor 203 is further turned on to discharge the word line 220<0> and to charge the word line 220<3>. Due to an increased turned-on transistors that are coupled to the word line 220<0>, the voltage level of the word line signal WL<0>, for example, a voltage V3 is smaller than the voltage V1 corresponding to one turned-on transistor. Alternatively stated, when a number of turned on transistors in the transistors 201-206 increases, the voltage V3 of the word line signal WL<0> is smaller than the voltage V1. To explain in another way, the number of turned on transistors (pull down circuits) is associated with a desired voltage difference between the supply voltage VDD and the activate word line voltage.

The configurations of FIGS. 10A-10B are given for illustrative purposes. Various implements are within the contemplated scope of the present disclosure. For example, in some embodiments, all of the selection signals SE<0>-SE<2> have the high logic state and the transistors 201-206 are correspondingly turned on to further discharge the word line 220<0> to the word line 220<2>.

With the configurations of the present application above, the desired active voltage of a certain word line is adjusted or controlled by programming the control signal RASB<0>-RASB<2>. It provides better accuracy and flexibility for word line driving. Furthermore, compared with some approaches utilizing at least twelve pull down circuits to achieve adjustment of the word line signals, the embodiments of FIG. 10A use only six transistors to modifying the voltage levels of the word lines 220<0>-220<3>.

Figure 11:
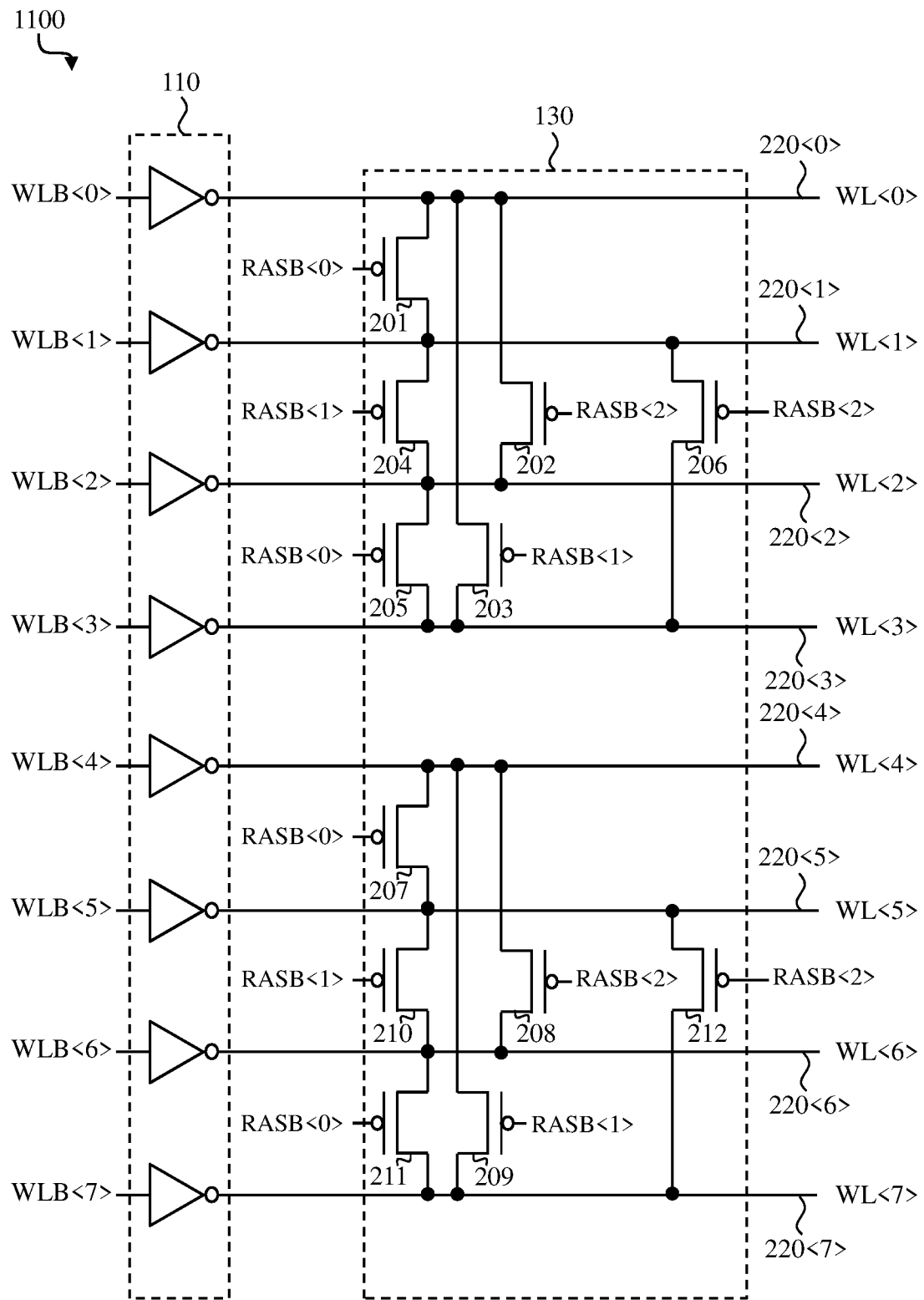
FIG. 11 is a schematic diagram of part of a memory device, in accordance with some embodiments of the present disclosure.

Reference is now made to FIG. 11. FIG. 11 is a schematic diagram of part of a memory device 1100, in accordance with some embodiments of the present disclosure. In some embodiments, the memory device 1100 is configured with respect to, for example, the memory device 1000 of FIG. 10A.

Compared with FIG. 10A, the memory device 1100 further includes transistors 207-212 coupled between word lines 220<4>-220<7> for adjusting voltage levels of word line signals WL<4>-WL<7>. The configurations of the transistors 207-212 are similar to the transistors 201-206. Hence, the repetitious descriptions are omitted here.

Figure 12:
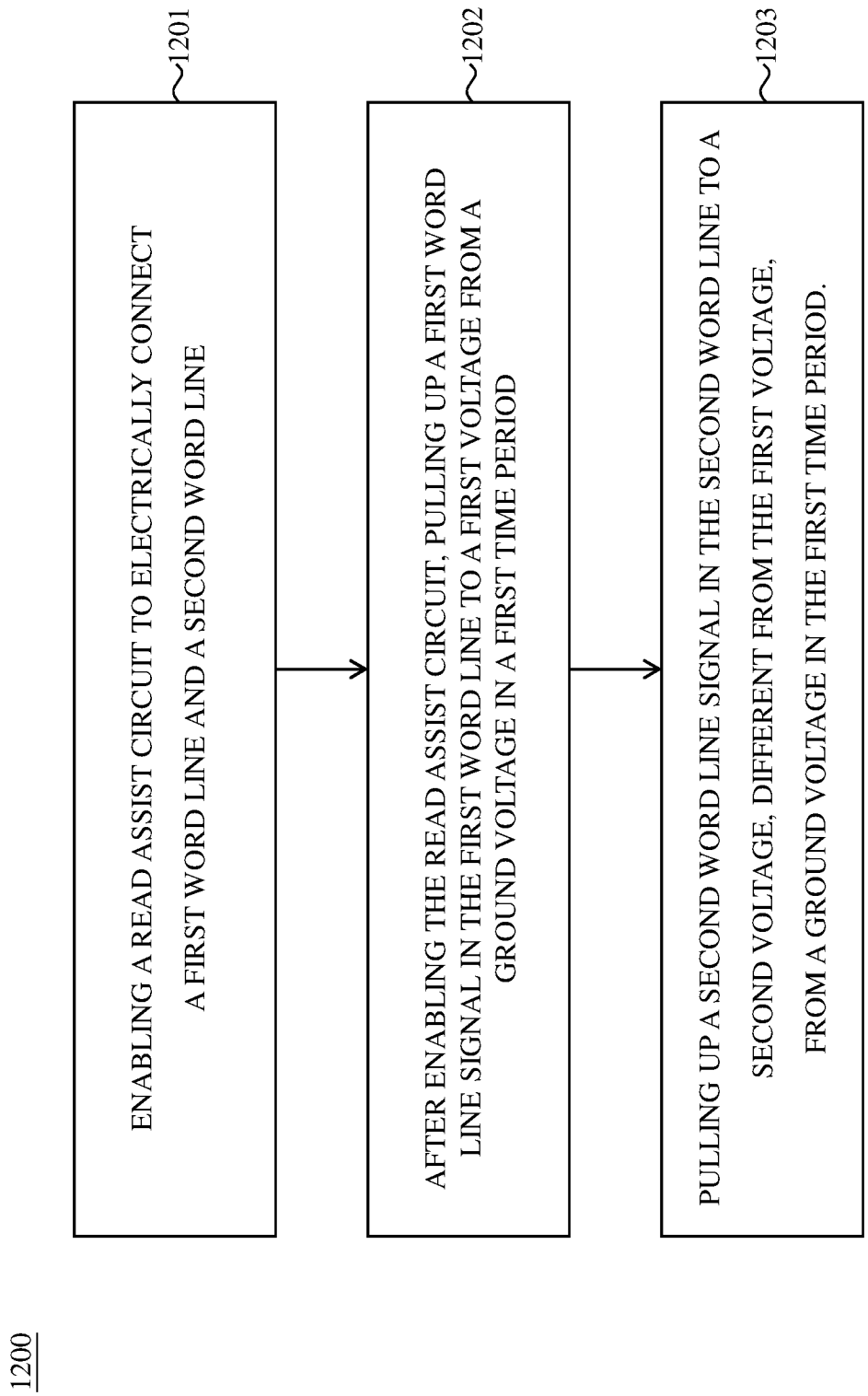
FIG. 12 is a flow chart of an operation method of a memory device, in accordance with some embodiments.

Reference is now made to FIG. 12. FIG. 12 is a flow chart of an operation method of the memory device 10, 20, 50, 80, 90, 1000, or 1100, in accordance with some embodiments. It is understood that additional operations can be provided before, during, and after the processes shown by FIG. 12, and some of the operations described below can be replaced or eliminated, for additional embodiments of the method. The order of the operations/processes may be interchangeable. Throughout the various views and illustrative embodiments, like reference numbers are used to designate like elements. The method 1200 includes operations 1201-1203 that are described below with reference to the memory device 10, 20, 50, 80, 90, 1000, or 1100 corresponding to FIGS. 1-11.

In operation 1201, the read assist circuit 130 is enabled to electrically connect the word line 104<n> and the word line 104<n+1>, as shown in FIGS. 1-2.

In operation 1202, as shown in FIG. 3-4, after enabling the read assist circuit 130, the word line signal WL<n> in the word line 104<n> is pulled up to the voltage V1 from a ground voltage (e.g., the supply voltage VSS) in the time period T1.

In operation 1203, as shown in FIGS. 3-4, the word line signal WL<n+1> in the word line 104<n+1> to the voltage V2, different from the voltage V1, from the ground voltage in the time period T2. In some embodiments, the voltage V2 is substantially smaller than the voltage V1.

In some embodiments, as shown in FIG. 4, the method 1200 further includes operations of pulling up the first word line signal WL<n> to the supply voltage VDD in the time period T2 after the time period T1, and further includes operations of disabling the read assist circuit 130 in the time period T2 (the control signal RAENB having high logic state) and pulling down the word line signal WL<n+1> to the ground voltage at time t6 of the time period T2 of FIG. 4. In various embodiments, the method 1200 includes operations of pulling down the word line signal WL<n> from the supply voltage VDD to the ground voltage at time t7 of the time period T2.

In some embodiments of FIG. 4, the method 1200 further includes operations of generating, in response to the word line signal word line signal WLB<n>, the word line signal WL<n>, in which the word line signal WLB<n> has a low logic state in the time periods T1-T2; disabling the read assist circuit 130 and pulling up the word line signal WL<n> to the supply voltage VDD in the time period T2; and pulling down the word line signal WL<n> from the supply voltage VDD to the supply voltage VSS (e.g., ground voltage) in a time period T3 after the time period T2, in which the word line signal WLB<n> has a high logic state in the time period T3.

In some embodiments, with reference to FIGS. 10A-10B, the operations of enabling the read assist circuit 130 includes operations of electrically connecting the word line 220<2> to the word lines 220<0>-220<1>, for example, through turning on the transistor 201-202 in the read assist circuit 130. In various embodiments, the operations of enabling the read assist circuit 130 further includes operations of electrically connecting the word line 220<3> to the word lines 220<0>-220<2>, for example, through turning on the transistor 201-203 in the read assist circuit 130.

Based on the discussion above, the present application provides a memory device and an operation method thereof. By at least two word lines sharing one pull down circuit, the necessary area for pull down circuits in the memory device is significantly reduced among 50% and therefore corresponding cost is cut. Furthermore, the associated loading caused by the word lines to the pull down circuit decreases, resulting better performance of speed and power consumption.

According to an embodiment of the present application, a memory device is provided, including a first word line coupled to a first memory cell, a second word line coupled to a second memory cell, and a read assist circuit coupled between the first and second word lines, and in a first time period configured, in response to a first control signal, to adjust a voltage level of the first word line to a first voltage and to adjust a voltage level of the second word line to a second voltage. In some embodiments, the first voltage is smaller than a first supply voltage, and the second voltage is greater than a second supply voltage smaller than the first supply voltage.

According to an embodiment of the present application, a memory device is provided, including a word line driver circuit coupled to a plurality of word lines; a control circuit configured to generate a first control signal is associated with a read operation; and a read assist circuit comprising a first transistor coupled between first and second word lines of the plurality of word lines. The first transistor is configured to be turned on, in response to the first control signal, to charge the second word line to have a first voltage greater than a ground voltage when the first word line is activated.

According to an embodiment of the present application, an operation method of a memory device is provided, including operations as below: enabling a read assist circuit to electrically connect a first word line and a second word line; after enabling the read assist circuit, pulling up a first word line signal in the first word line to a first voltage from a ground voltage in a first time period; and pulling up a second word line signal in the second word line to a second voltage, different from the first voltage, from the ground voltage in the first time period.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
   a first word line coupled to a first memory cell and a second word line coupled to a second memory cell;
   a read assist circuit coupled between the first and second word lines, and in a first time period configured, in response to a first control signal, to adjust a voltage level of the first word line to a first voltage and to adjust a voltage level of the second word line to a second voltage,
   wherein the first voltage is smaller than a first supply voltage, and the second voltage is greater than a second supply voltage smaller than the first supply voltage; and
   a control circuit configured to generate a plurality of second control signals to the read assist circuit based on a third control signal and a plurality of selection signals, wherein one of the plurality of second control signals is transmit to a first transistor in the read assist circuit, another of the plurality of second control signals is transmit to a second transistor in the read assist circuit, and the first transistor and the second transistor are coupled in series.

2. The memory device of claim 1, wherein the read assist circuit comprises:
   a plurality of transistors comprising the first transistor and the second transistor, wherein the first transistor and the second transistor are coupled in series between the first and second word lines.

3. The memory device of claim 1, wherein the read assist circuit comprises:
   a plurality of transistors comprising the first transistor, the second transistor, and a third transistor, wherein the first transistor and the second transistor are coupled with the third transistor in parallel between the first and second word lines.

4. The memory device of claim 1,
   wherein the first control signal has a first logic state in the first time period and a second logic state, different from the first logic state, in a second time period,
   wherein in the second time period, the read assist circuit is further configured to, in response to the first control signal, disconnect the first word line from the second word line; and
   a word line driver circuit configured to charge the first word line to have the first supply voltage and to discharge the second word line to have the second supply voltage.

5. The memory device of claim 1, further comprising:
   a third word line and a fourth word line;
   wherein the read assist circuit comprises:
      a plurality of transistors, wherein each of the first to fourth word lines are coupled to three transistors in the plurality of transistors,
      wherein the plurality of transistors are configured to be turned on separately in response to the plurality of second control signals to adjust voltage levels of the first to fourth word lines,
      wherein the three transistors comprise the first transistor and the second transistor.

6. The memory device of claim 5,
   wherein the third control signal is inverted from the first control signal.

7. The memory device of claim 5, wherein the first word line has a third voltage smaller than the first voltage when a number of turned on transistors in the plurality of transistors increases.

8. A method, comprising:
   generating, based on a first control signal and a plurality of selection signals, a plurality of second control signals to a read assist circuit;
   enabling the read assist circuit to electrically connect a first word line and a second word line;

after enabling the read assist circuit, pulling up a first word line signal in the first word line to a first voltage from a ground voltage in a first time period; and pulling up a second word line signal in the second word line to a second voltage, different from the first voltage, from the ground voltage in the first time period, wherein one of the plurality of second control signals is transmit to a first transistor in the read assist circuit, another of the plurality of second control signals is transmit to a second transistor in the read assist circuit, and the first transistor and the second transistor are coupled in series.

9. The method of claim 8, wherein the second voltage is substantially smaller than the first voltage.

10. The method of claim 8, further comprising:
pulling up the first word line signal to a supply voltage in a second time period after the first time period.

11. The method of claim 10, further comprising:
disabling the read assist circuit in the second time period; and
pulling down the second word line signal to the ground voltage at a first time of the second time period.

12. The method of claim 11, further comprising:
pulling down the first word line signal from the supply voltage to the ground voltage at a second time of the second time period after the first time of the second time period.

13. The method of claim 8, further comprising:
generating, in response to a third word line signal, the first word line signal, wherein the third word line signal has a low logic state in the first time period and a second time period after the first time period;
disabling the read assist circuit and pulling up the first word line signal to a supply voltage in the second time period; and
pulling down the first word line signal from the supply voltage to the ground voltage in a third time period after the second time period, wherein the third word line signal has a high logic state in the third time period.

14. The method of claim 8, wherein enabling the read assist circuit comprises:
electrically connecting a third word line to the first and second word lines.

15. The method of claim 14, wherein enabling the read assist circuit further comprises:
electrically connecting a fourth word line to the first and third word lines.

16. A memory device, comprising:
a word line driver circuit coupled to a plurality of word lines;
a control circuit configured to generate, based on a first control signal and a plurality of selection signals, a plurality of second control signals associated with a read operation; and
a read assist circuit comprising a first transistor and a second transistor, wherein the first transistor is coupled between first and second word lines of the plurality of word lines and configured to receive one of the plurality of second control signals, wherein the second transistor is coupled between the second word line and a third word line of the plurality of word lines and configured to receive another of the plurality of second control signals, wherein the first transistor and the second transistor are coupled in series,
wherein the first transistor is configured to be turned on to charge the second word line to have a first voltage greater than a ground voltage when the first word line is activated.

17. The memory device of claim 16, wherein the first transistor is a P-type transistor having a first terminal coupled to the first word line, a second terminal coupled to the second word line, and a control terminal receiving the one of the plurality of second control signals.

18. The memory device of claim 16, wherein the read assist circuit further comprises:
a third transistor coupled between the third word line and a fourth word line of the plurality of word lines,
wherein the second transistor, the third transistor, or the combinations thereof are configured to be turned on to discharge the first word line.

19. The memory device of claim 18, further comprising:
a fourth transistor coupled between the first word line and the third word line;
a fifth transistor coupled between the first word line and the fourth word line; and
a sixth transistor coupled between the second word line and the fourth word line,
wherein at least two of the first to sixth transistors are configured to be turned on to reduce a voltage level of one of the first to fourth word lines.

20. The memory device of claim 18, wherein the control circuit comprises:
a plurality of NAND gates configured to receive the first control signal and the plurality of selection signals and to generate the plurality of second control signals to control the first to third transistors.

\* \* \* \* \*